US009336091B2

(12) United States Patent
Harnik et al.

(10) Patent No.: US 9,336,091 B2
(45) Date of Patent: May 10, 2016

(54) RELIABILITY ENHANCEMENT IN A DISTRIBUTED STORAGE SYSTEM

(71) Applicant: International Business Machines Corporation, Armonk, NY (US)

(72) Inventors: Danny Harnik, Tel Mond (IL); Elliot K Kolodner, Haifa (IL); Dmitry Sotnikov, Givataim (IL); Paula K Ta-Shma, Tel Aviv (IL)

(73) Assignee: International Business Machines Corporation, Armonk, NY (US)

( * ) Notice: Subject to any disclaimer, the term of this patent is extended or adjusted under 35 U.S.C. 154(b) by 44 days.

(21) Appl. No.: 14/198,592

(22) Filed: Mar. 6, 2014

(65) Prior Publication Data

US 2015/0254140 A1     Sep. 10, 2015

(51) Int. Cl.
*G06F 11/00* (2006.01)
*G06F 11/14* (2006.01)
*G06F 11/20* (2006.01)
*G06F 11/10* (2006.01)

(52) U.S. Cl.
CPC ........ *G06F 11/1451* (2013.01); *G06F 11/1092* (2013.01); *G06F 11/1402* (2013.01); *G06F 11/1448* (2013.01); *G06F 11/1458* (2013.01); *G06F 11/2094* (2013.01)

(58) Field of Classification Search
CPC . G06F 3/067; G06F 11/1092; G06F 11/2094; G06F 11/1458; G06F 11/1448; G06F 11/1402
See application file for complete search history.

(56) References Cited

U.S. PATENT DOCUMENTS

| 6,516,425 | B1 | 2/2003 | Belhadj et al. |
| 7,743,276 | B2 | 6/2010 | Jacobson et al. |
| 8,019,728 | B2 | 9/2011 | Bachwani et al. |
| 2012/0072689 | A1* | 3/2012 | Kempen ............ G06F 17/30215 711/162 |
| 2012/0266011 | A1 | 10/2012 | Storer et al. |
| 2013/0047028 | A1 | 2/2013 | Daikokuya et al. |
| 2013/0205167 | A1 | 8/2013 | Deepak |
| 2013/0212428 | A1 | 8/2013 | Yamamoto et al. |
| 2013/0246865 | A1* | 9/2013 | Resch ................. G06F 11/0727 714/54 |

FOREIGN PATENT DOCUMENTS

| WO | 2012017641 A1 | 9/2012 |
| WO | 2015132690 A1 | 9/2015 |

OTHER PUBLICATIONS

Venkatesan et al., "A general reliability model for data storage systems.", Proceedings of the 9th Int'l Conference on Quantitative Evaluation of Systems (QEST) (London, UK), Sep. 2012, pp. 209-219.

(Continued)

*Primary Examiner* — Charles Ehne
(74) *Attorney, Agent, or Firm* — Suzanne Erez; Brian M. Restauro

(57) ABSTRACT

Machines, systems and methods for enhancing data recovery in a data storage system, the method comprising determining whether one or more data storage mediums in a data storage system are unavailable; determining data that are at a risk of loss, due to said one or more data storage mediums being unavailable; from among the data that is determined to be at the risk of loss, identifying data that is highly vulnerable to loss; and creating one or more temporary replicas of the data that is highly vulnerable to loss.

17 Claims, 4 Drawing Sheets

(56) References Cited

OTHER PUBLICATIONS

Xin et al., "Evaluation Of Distributed Recovery In Large-Scale Storage Systems", Proceedings of the 13th IEEE International symposium on High Performance Distributed Computing, Honolulu Hawaii, Jun. 2004.

Yang et al., "A Reliability Optimization Method For Raid-Structured Storage Systems Based On Active Data Migration", The Journal of Systems and Software 86, 2013, pp. 468-484.

Suarez-Castanon et al., "Protecting Data Against Consecutive Disk Failures In Raid-5", 2009 Mexican International Conference on Computer Science ENC, Sep. 2009, pp. 353-359.

Venkatesan et al., "Effect Of Replica Placement On The Reliability Of Large-Scale Data Storage Systems", IEEE International Symposium on Modeling, Analysis & Simulation of Computer and Telecommunication Systems (MASCOTS), Aug. 2010, pp. 79-88.

International Search Report with Written Opinion dated Jun. 9, 2015, PCT/IB2015/051266 filed on Feb. 19, 2015.

* cited by examiner

RELIABILITY ENHANCEMENT IN A DISTRIBUTED STORAGE SYSTEM

COPYRIGHT & TRADEMARK NOTICES

A portion of the disclosure of this patent document may contain material, which is subject to copyright protection. The owner has no objection to the facsimile reproduction by any one of the patent document or the patent disclosure, as it appears in the Patent and Trademark Office patent file or records, but otherwise reserves all copyrights whatsoever.

Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

TECHNICAL FIELD

The disclosed subject matter relates generally to enhancing reliability in a distributed storage system and, more particularly, to a system and method for an auxiliary reliability boosting mechanism for distributed storage systems.

BACKGROUND

It is common practice to store information with some level of redundancy to avoid data loss in case of hardware failure. This redundancy can be introduced by way of duplicating (or replicating) the data or by adding some redundancy encoding (e.g., parity blocks or erasure codes). Redundancy data or data replicas may be stored across several domains to allow data recovery in case of a domain failure.

Replicas may be stored on different disks, servers, racks or geographically distant sites, so that failure of a single disk, server, rack or even a whole data center would not cause data loss. Thus, built-in redundancy makes a system resilient against simultaneous failures. Regardless, a system can only withstand a certain number of simultaneous failures. For example, a storage system with triple replication is protected against a double disk failure, but not a triple disk failure.

To provide reliability via replication, once a failure happens, the system restores the data that was located on the failed hardware from the remaining replicas to a predetermined redundancy level. During restoration, the system is vulnerable to additional failures, so it is important that the restoration is performed as quickly as possible. Not all data involved in the restoration process is equally vulnerable, however. For example, data with a smaller number of replicas can be generally considered as more vulnerable.

It would be desirable to enhance the reliability of a storage system based on a recovery scheme that dynamically prioritizes the recovery of more vulnerable data. Implementing such recovery scheme is typically not readily possible because the recovery components in a storage system may be implemented in hardware, or subject to license terms that prohibit modifications to the system's recovery mechanism. Systems and methods are needed that come overcome the above shortcomings.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

In accordance with one embodiment, a method for enhancing data recovery in a data storage system is provided. The method comprises determining whether one or more data storage mediums in a data storage system are unavailable; determining data that are at a risk of loss, due to said one or more data storage mediums being unavailable; from among the data that is determined to be at the risk of loss, identifying data that is highly vulnerable to loss; and creating one or more temporary replicas of the data that is highly vulnerable to loss.

In accordance with one or more embodiments, a system comprising one or more logic units is provided. The one or more logic units are configured to perform the functions and operations associated with the above-disclosed methods. In yet another embodiment, a computer program product comprising a computer readable storage medium having a computer readable program is provided. The computer readable program when executed on a computer causes the computer to perform the functions and operations associated with the above-disclosed methods.

One or more of the above-disclosed embodiments in addition to certain alternatives are provided in further detail below with reference to the attached figures. The disclosed subject matter is not, however, limited to any particular embodiment disclosed.

BRIEF DESCRIPTION OF THE DRAWINGS

The disclosed embodiments may be better understood by referring to the figures in the attached drawings, as provided below.

Features, elements, and aspects that are referenced by the same numerals in different figures represent the same, equivalent, or similar features, elements, or aspects, in accordance with one or more embodiments.

DETAILED DESCRIPTION OF EXAMPLE EMBODIMENTS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

Figure 1:
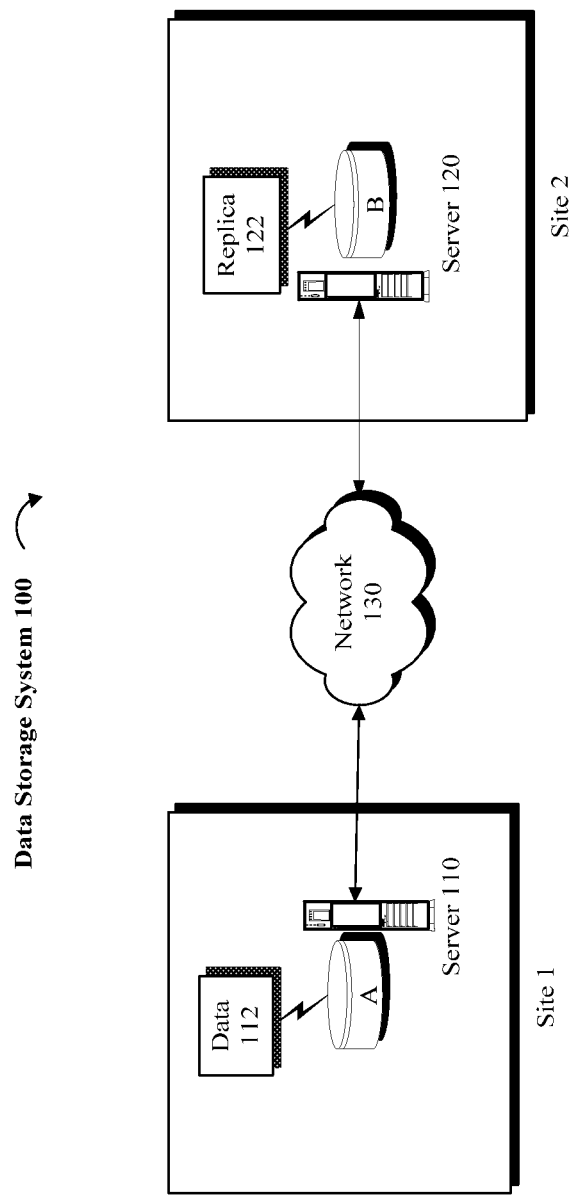
FIG. 1 illustrates an exemplary data storage system in accordance with one or more embodiments.

Referring to FIG. 1, a data storage system 100 is provided in which data 112 is stored in a data storage medium A in a first site having a server 110. To provide a primary means for data recovery, copies of the data 112 may be replicated across storage media B on site 2 having a server 120. In this manner a primary recovery system may be provided in data storage system 100. In addition to the primary recovery system, a secondary mechanism may be introduced over the primary data recovery infrastructure in place for the data storage system 100.

The secondary mechanism may be implemented by way of an auxiliary component, for example, that monitors the data storage system 100 to create additional temporary replicas of data by using the system's existing application programming interface (API) without changing the data storage system's 100 primary means of data recovery. As such, the secondary mechanism may be provided to improve the reliability of the overall data recovery operations in conjunction with the primary data recovery infrastructure used to restore or recover the lost data.

Figure 2:
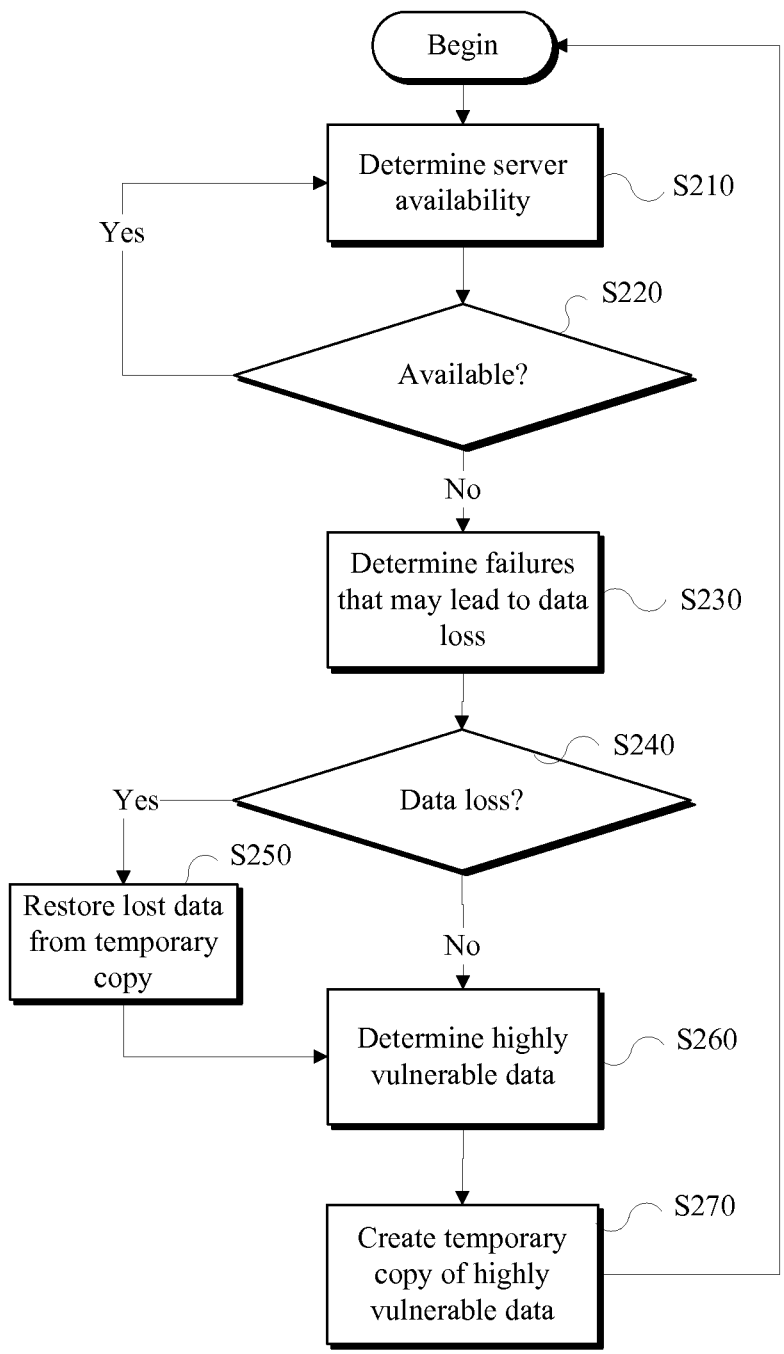
FIG. 2 is a flow diagram of an exemplary method of enhancing reliability in a distributed storage system in accordance with one embodiment.

Referring to FIG. 2, the secondary mechanism may be implemented to independently scan servers in the data storage system and determine if the servers (or storage media such as disks utilized by the servers) are available (S210, S220). If, for example, one of the servers or disks is not available, a list of at risk data (e.g., data objects) that is supposed to be stored on the unavailable servers or disks is obtained. The list may be used to determine failures that may lead to data loss (S230). If it is determined that certain data is lost (S240), then the lost data may be restored from a temporary copy or replica of the data stored elsewhere (S250).

In one embodiment, the list of at risk data may be examined to determine if there is an intersection between the at risk data identified in the list and other lists of at risk data associated with previous failures (e.g., failures that may still be subject to a recovery process). The examination helps determine highly vulnerable data (S260). If so, additional temporary copies or replicas of the highly vulnerable data may be created (S270). In one implementation, if the at risk data is successfully recovered, the temporary replicas may be removed. Otherwise, the temporary replicas may be kept to maintain or enhance the reliability of the data storage system and for data recovery, if needed.

As provided in further detail below, in most circumstances the partition of the highly vulnerable data (e.g., data that is affected by multiple failures) is negligible in comparison to data that is affected by a single failure. As such, time that is needed to create addition temporary replicas of highly vulnerable data is also negligible. Vulnerability of a data object may be calculated based on, for example, the probability that the particular data object may be lost during a future failure. Such vulnerability may be approximated by determining the number of remaining replicas of a data object, or by considering some properties that may be correlated to the possibility of failure (e.g., age of the disk on which the data object is stored).

In one embodiment, vulnerability in the data storage system 100 may be associated with a certain level of hierarchy, wherein the hierarchy may define which data is more vulnerable than others. As noted earlier, in the data storage system 100, the volume of highly vulnerable data may be substantially smaller than the volume of vulnerable or non-vulnerable data. As such, in one implementation, if temporary replicas for the highly vulnerable data are created first, then reliability of the data storage system 100 may be significantly improved at a relatively low cost.

The reason for the relatively low cost associated with replicating the highly vulnerable data would be better appreciated by considering the alternative of indiscriminately replicating all vulnerable data or all the data in the system. Naturally, temporarily replicating the highly vulnerable data would take less time and resources. For example, if only 5% of data in the data storage system 100 is deemed to be highly vulnerable, then creating temporary replicas of that 5% would be relatively fast and inexpensive. Once the highly vulnerable data is replicated, then the less vulnerable data may be replicated later.

As noted, the determination about which data is highly vulnerable may be made, depending on implementation, by detecting data that has been subjected to a certain number of failures according to historic or real-time information. Where the number of failures is beyond a predetermined failure tolerance threshold, for example, the subject data may be deemed as highly vulnerable. Using a hierarchical approach, in one embodiment, various levels of vulnerability may be determined for different data or data sets, such that the highly vulnerable data is the data that is associated with the highest number of failures.

In an example implementation, data with the largest number of lost replicas across the storage system may be deemed as the highly vulnerable data. In one or more embodiments, a scheme (or algorithm) may be utilized to calculate the level of vulnerability based on various factors. For example, vulnerability may be calculated based on failure rate of the data storage system 100 components (e.g., disks, servers, etc.) involved in storing the data and the replicas, real-time detection of component failures across the data storage system 100, historic failure data collected for the data storage components or similar data storage components, or based on manufacturer provided statistics for failure rates of the respective data storage components.

As noted earlier, in some embodiments, the highly vulnerable data may be determined based on factors other than the associated failure rate of the system components. For example, vulnerability may be measured by one or more of the following metrics: age of the system components, number of viable replicas for the data, error rate associated with reading the data, or any other factor that would influence the probability of data loss or the potential for recovery of the data from its replicas.

Regardless of the mechanism utilized to determine the highly vulnerable data and the hierarchy of data vulnerability, once the highly vulnerable data is determined, one or more replicas of the highly vulnerable data may be made and stored in one or more data storage mediums (e.g., tape, hard drive disk, non-volatile memory, solid stated storage device, etc.). The data storage mediums may be accessible (but desirably separately situated) in relation to the existing data recovery infrastructure in the data storage system 100 either directly, via an application programming interface (API), or otherwise.

Based on the above approach, the highly vulnerable data that have the highest risk of loss are copied first. Depending on implementation, remaining vulnerable data may be copied according to the respective risk of loss in a hierarchical fashion, so that the more vulnerable data is copied before the less vulnerable data, until no more vulnerable data is left that has not been copied. Depending on implementation, as vulnerability status of certain data is updated, the number of corresponding copies may be updated in a dynamic fashion. For example, the number of copies for data that is no longer considered to be at risk or at a vulnerable state may be reduced.

Advantageously, based the above replica management scheme, the chance of loss associated with data that is identified as highly vulnerable may be significantly reduced in a relatively short amount of time and at a relatively small cost. In one or more embodiments, if a copy of data or a replica of the data is lost, the copy or the replica may be restored from other replicas. Lost copies of data may be recovered upon a request generated by an administrative entity or by way of a mechanism that runs periodically in the background to restore any lost copies in the underlying data recovery infrastructure.

In one embodiment, the replication process associated with making replicas of vulnerable data is external to the primary data recovery system such that the duplicate copies of the data are not an integral part of the storage system. In the above, a replication methodology has been discussed in accordance with one or more embodiments. In the following, particular features and implementations are provided by way of two illustrative examples. It is noteworthy, however, that the following features are exemplary in nature and are not meant to limit the scope of the claimed subject matter to any specific details.

In a two-way replication example, data replicas are placed on RAID 5 devices—a RAID 5 device may be local and the two-way replication may be global (e.g., implemented over a wide area network (WAN)). In this example, single disk failures may be handled by an internal mechanism of the RAID 5 device. The global replication process may not interfere in this process, because data remains available. However, if another disk fails in a different RAID 5 device, the recovery processes may run independently and in parallel.

In the above example, data that is stored at the intersection of two degraded RAID arrays is more at risk than other data in the system. This scenario is particularly relevant since the recovery process of the RAID device is extremely lengthy and increases with the size of the disks in the system. Making stabilizing replicas for the data in the intersection may be completed much faster than time needed to complete recovery of each of the RAID devices. Therefore, making the stabilizing copies may greatly reduce the probability of data loss.

In a three-way replication example, two disk failures may not cause data loss, but may jeopardize data that had replicas on both of the failed disks (i.e., the data has a single remaining replica and may be lost if the last disk fails). Creation of an additional temporary stabilizing replica will protect the data so that if a third failure occurs during the recovery process, no data will be lost. In a distributed system with three-way replication, the amount of data in the intersection of two disks is by far smaller than the total amount of data on both disks. As such, while the process of recovery for a whole disk would be very time consuming, the time to create the stabilizing replicas would be small. Therefore, the time frame in which data is in real risk of loss is minimal.

Openstack Swift is an example of a system that does not differentiate between different levels of data at risk and does not prioritize recovery. Openstack has interfaces that allow identifying the data externally. By employing the above-discussed scheme, reliability of a SWIFT cluster may be enhanced without having to contribute code to the open source community, yet still benefit from the current open source recovery mechanism and any updates or bug fixes that may be added to the common code base. It is noted that the terms "replica" or "duplicate" and "replication" or "duplication" have been interchangeably used herein and refer to the process of making an extra copy of the target data.

Using the above methodologies, since the volume of highly vulnerable data is small related to all other data, by replicating the highly vulnerable data, a dramatic improvement may be achieved in maintaining the reliability of the system by way of a relatively low level of overhead. Further, advantageously, the primary data recovery mechanism may remain homogeneous across system hardware, while heterogeneous hardware may be utilized to implement the secondary replication layer to support faster access to certain data when needed (e.g., temporary copies of highly vulnerable data may be stored on solid state devices with fast access times).

References in this specification to "an embodiment", "one embodiment", "one or more embodiments" or the like, mean that the particular element, feature, structure or characteristic being described is included in at least one embodiment of the disclosed subject matter. Occurrences of such phrases in this specification should not be particularly construed as referring to the same embodiment, nor should such phrases be interpreted as referring to embodiments that are mutually exclusive with respect to the discussed features or elements.

In different embodiments, the claimed subject matter may be implemented as a combination of both hardware and software elements, or alternatively either entirely in the form of hardware or entirely in the form of software. Further, computing systems and program software disclosed herein may comprise a controlled computing environment that may be presented in terms of hardware components or logic code executed to perform methods and processes that achieve the results contemplated herein. Said methods and processes, when performed by a general purpose computing system or machine, convert the general purpose machine to a specific purpose machine.

Figure 3:
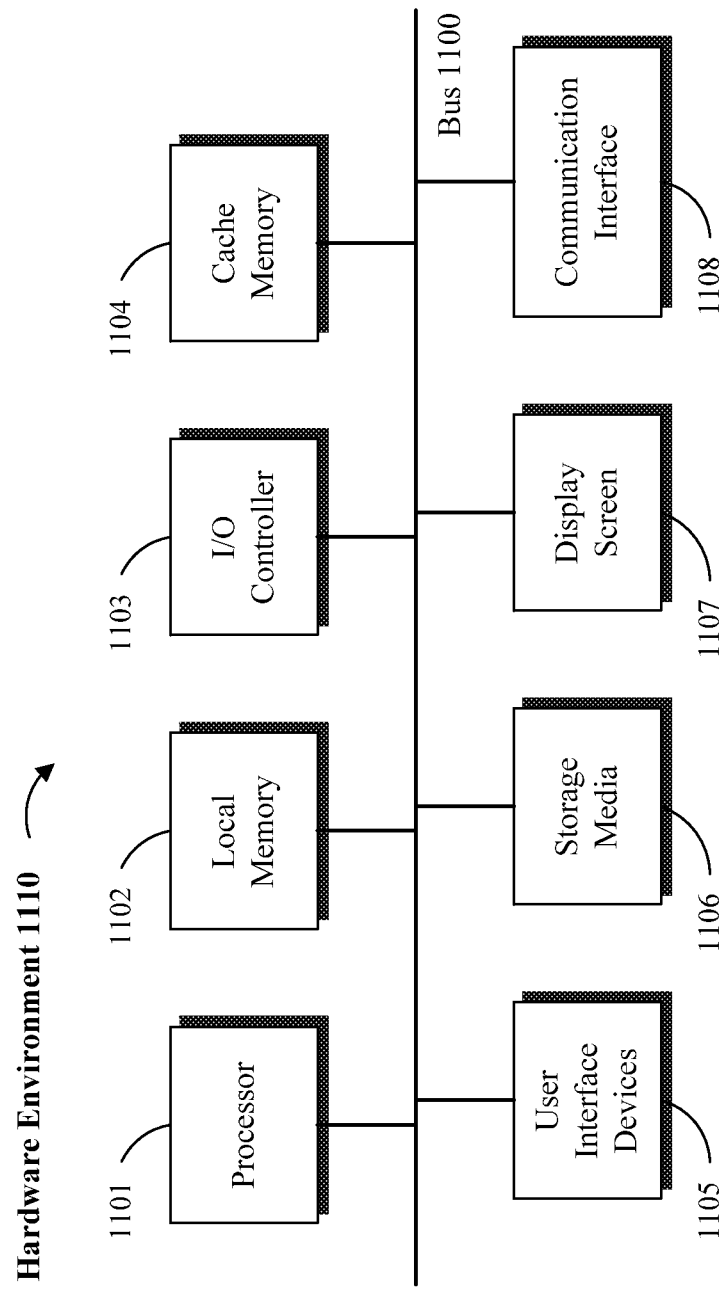
FIGS. 3 and 4 are block diagrams of hardware and software environments in which the disclosed systems and methods may operate, in accordance with one or more embodiments.
Figure 4:
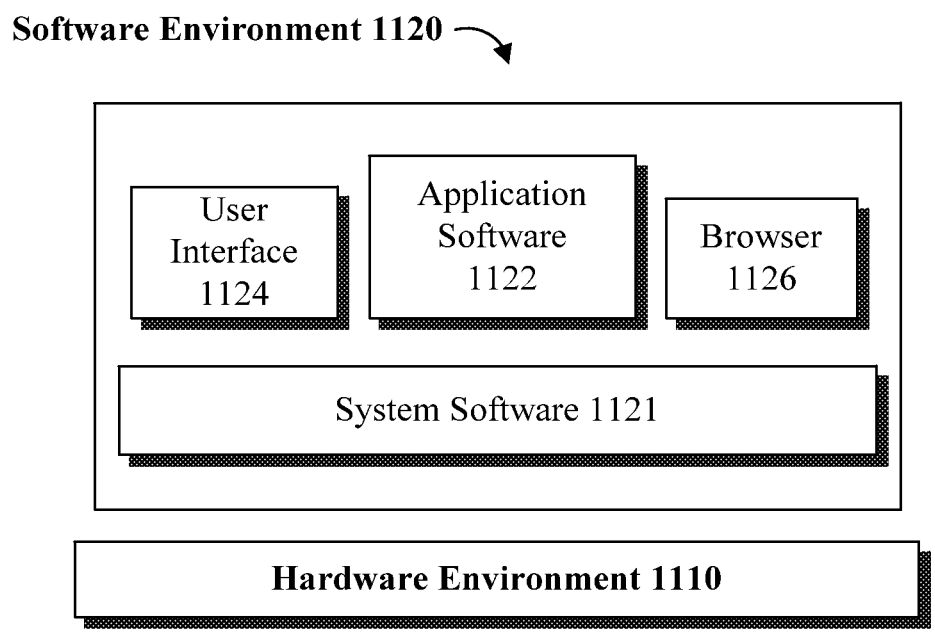

Referring to FIGS. 3 and 4, a computing system environment in accordance with an exemplary embodiment may be composed of a hardware environment 1110 and a software environment 1120. The hardware environment 1110 may comprise logic units, circuits or other machinery and equipments that provide an execution environment for the components of software environment 1120. In turn, the software environment 1120 may provide the execution instructions, including the underlying operational settings and configurations, for the various components of hardware environment 1110.

Referring to FIG. 3, the application software and logic code disclosed herein may be implemented in the form of machine readable code executed over one or more computing systems represented by the exemplary hardware environment 1110. As illustrated, hardware environment 110 may comprise a processor 1101 coupled to one or more storage elements by way of a system bus 1100. The storage elements, for example, may comprise local memory 1102, storage media 1106, cache memory 1104 or other machine-usable or computer readable media. Within the context of this disclosure, a machine usable or computer readable storage medium may include any recordable article that may be utilized to contain, store, communicate, propagate or transport program code.

A computer readable storage medium may be an electronic, magnetic, optical, electromagnetic, infrared, or semiconductor medium, system, apparatus or device. The computer readable storage medium may also be implemented in a propagation medium, without limitation, to the extent that such implementation is deemed statutory subject matter. Examples of a computer readable storage medium may include a semiconductor or solid-state memory, magnetic tape, a removable computer diskette, a random access memory (RAM), a read-only memory (ROM), a rigid magnetic disk, an optical disk, or a carrier wave, where appropriate. Current examples of optical disks include compact disk, read only memory (CD-ROM), compact disk read/write (CD-R/W), digital video disk (DVD), high definition video disk (HD-DVD) or Blue-ray™ disk.

In one embodiment, processor 1101 loads executable code from storage media 1106 to local memory 1102. Cache memory 1104 optimizes processing time by providing temporary storage that helps reduce the number of times code is loaded for execution. One or more user interface devices 1105

(e.g., keyboard, pointing device, etc.) and a display screen 1107 may be coupled to the other elements in the hardware environment 1110 either directly or through an intervening I/O controller 1103, for example. A communication interface unit 1108, such as a network adapter, may be provided to enable the hardware environment 1110 to communicate with local or remotely located computing systems, printers and storage devices via intervening private or public networks (e.g., the Internet). Wired or wireless modems and Ethernet cards are a few of the exemplary types of network adapters.

It is noteworthy that hardware environment 1110, in certain implementations, may not include some or all the above components, or may comprise additional components to provide supplemental functionality or utility. Depending on the contemplated use and configuration, hardware environment 1110 may be a machine such as a desktop or a laptop computer, or other computing device optionally embodied in an embedded system such as a set-top box, a personal digital assistant (PDA), a personal media player, a mobile communication unit (e.g., a wireless phone), or other similar hardware platforms that have information processing or data storage capabilities.

In some embodiments, communication interface 1108 acts as a data communication port to provide means of communication with one or more computing systems by sending and receiving digital, electrical, electromagnetic or optical signals that carry analog or digital data streams representing various types of information, including program code. The communication may be established by way of a local or a remote network, or alternatively by way of transmission over the air or other medium, including without limitation propagation over a carrier wave.

As provided here, the disclosed software elements that are executed on the illustrated hardware elements are defined according to logical or functional relationships that are exemplary in nature. It should be noted, however, that the respective methods that are implemented by way of said exemplary software elements may be also encoded in said hardware elements by way of configured and programmed processors, application specific integrated circuits (ASICs), field programmable gate arrays (FPGAs) and digital signal processors (DSPs), for example.

Referring to FIG. 4, software environment 1120 may be generally divided into two classes comprising system software 1121 and application software 1122 as executed on one or more hardware environments 1110. In one embodiment, the methods and processes disclosed here may be implemented as system software 1121, application software 1122, or a combination thereof. System software 1121 may comprise control programs, such as an operating system (OS) or an information management system, that instruct one or more processors 1101 (e.g., microcontrollers) in the hardware environment 1110 on how to function and process information. Application software 1122 may comprise but is not limited to program code, data structures, firmware, resident software, microcode or any other form of information or routine that may be read, analyzed or executed by a processor 1101.

In other words, application software 1122 may be implemented as program code embedded in a computer program product in form of a machine-usable or computer readable storage medium that provides program code for use by, or in connection with, a machine, a computer or any instruction execution system. Moreover, application software 1122 may comprise one or more computer programs that are executed on top of system software 1121 after being loaded from storage media 1106 into local memory 1102. In a client-server architecture, application software 1122 may comprise client software and server software. For example, in one embodiment, client software may be executed on a client computing system that is distinct and separable from a server computing system on which server software is executed.

Software environment 1120 may also comprise browser software 1126 for accessing data available over local or remote computing networks. Further, software environment 1120 may comprise a user interface 1124 (e.g., a graphical user interface (GUI)) for receiving user commands and data. It is worthy to repeat that the hardware and software architectures and environments described above are for purposes of example. As such, one or more embodiments may be implemented over any type of system architecture, functional or logical platform or processing environment.

It should also be understood that the logic code, programs, modules, processes, methods and the order in which the respective processes of each method are performed are purely exemplary. Depending on implementation, the processes or any underlying sub-processes and methods may be performed in any order or concurrently, unless indicated otherwise in the present disclosure. Further, unless stated otherwise with specificity, the definition of logic code within the context of this disclosure is not related or limited to any particular programming language, and may comprise one or more modules that may be executed on one or more processors in distributed, non-distributed, single or multiprocessing environments.

As will be appreciated by one skilled in the art, a software embodiment may include firmware, resident software, microcode, etc. Certain components including software or hardware or combining software and hardware aspects may generally be referred to herein as a "circuit," "module" or "system." Furthermore, the subject matter disclosed may be implemented as a computer program product embodied in one or more computer readable storage medium(s) having computer readable program code embodied thereon. Any combination of one or more computer readable storage medium(s) may be utilized. The computer readable storage medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

In the context of this document, a computer readable storage medium may be any tangible medium that can contain, or store a program for use by or in connection with an instruction execution system, apparatus, or device. A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. A computer readable storage medium, as used herein, is not to be construed as being transitory signals, such as radio waves or other freely propagating electromagnetic waves, electromagnetic waves propagating through a waveguide or other transmission media (e.g., light pulses passing through a fiber-optic cable), or electrical signals transmitted through a wire.

Program code embodied on a computer readable storage medium may be transmitted using any appropriate medium, including but not limited to wireless, wireline, optical fiber cable, RF, etc., or any suitable combination of the foregoing. Computer program code for carrying out the disclosed operations may be written in any combination of one or more programming languages, including an object oriented programming language such as Java, Smalltalk, C++ or the like and conventional procedural programming languages, such as the "C" programming language or similar programming languages.

The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Certain embodiments are disclosed with reference to flowchart illustrations or block diagrams of methods, apparatus (systems) and computer program products according to embodiments. It will be understood that each block of the flowchart illustrations or block diagrams, and combinations of blocks in the flowchart illustrations and/or block diagrams, can be implemented by computer program instructions. These computer program instructions may be provided to a processor of a general purpose computer, a special purpose machinery, or other programmable data processing apparatus to produce a machine, such that the instructions, which execute via the processor of the computer or other programmable data processing apparatus, create means for implementing the functions or acts specified in the flowchart or block diagram block or blocks.

These computer program instructions may also be stored in a computer readable storage medium that can direct a computer, other programmable data processing apparatus, or other devices to function in a particular manner, such that the instructions stored in the computer readable storage medium produce an article of manufacture including instructions which implement the function or act specified in the flowchart or block diagram block or blocks.

The computer program instructions may also be loaded onto a computer, other programmable data processing apparatus, or other devices to cause a series of operational steps to be performed on the computer, other programmable apparatus or other devices to produce a computer or machine implemented process such that the instructions which execute on the computer or other programmable apparatus provide processes for implementing the functions or acts specified in the flowchart or block diagram block or blocks.

The flowchart and block diagrams in the figures illustrate the architecture, functionality, and operation of possible implementations of systems, methods and computer program products according to various embodiments. In this regard, each block in the flowchart or block diagrams may represent a module, segment, or portion of code, which comprises one or more executable instructions for implementing the specified logical functions. It should also be noted that, in some alternative implementations, the functions noted in the block may occur in any order or out of the order noted in the figures.

For example, two blocks shown in succession may, in fact, be executed substantially concurrently, or the blocks may sometimes be executed in the reverse order, depending upon the functionality involved. It will also be noted that each block of the block diagrams or flowchart illustration, and combinations of blocks in the block diagrams or flowchart illustration, may be implemented by special purpose hardware-based systems that perform the specified functions or acts, or combinations of special purpose hardware and computer instructions.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method for enhancing data recovery in a data storage system, the method comprising:
   determining whether one or more data storage mediums in a data storage system are unavailable;
   determining data associated with the one or more data storage mediums in the data storage system that is at a risk of loss, due to the one or more data storage mediums unavailable;
   identifying a subset of data that is highly vulnerable to loss from the data that is determined to be at the risk of loss, wherein the data that is highly vulnerable to loss is determined based on calculating a probability that the data will be lost during a future failure event; and
   creating one or more temporary replicas of the data that is highly vulnerable to loss.

2. The method of claim 1 wherein the data that is at the risk of loss comprises data stored on the one or more unavailable data storage mediums.

3. The method of claim 1 wherein at least one temporary replica is created on an external storage device or a solid state storage device.

4. The method of claim 1 wherein the data that is highly vulnerable to loss comprises data with a number of replicas that is less than a predetermined threshold.

5. The method of claim 1 wherein the data that is highly vulnerable to loss is determine based on considering one or more factors that are correlated to possibility of a future failure event.

6. The method of claim 5 wherein the one or more factors comprise at least one of age of a disk on which the data is stored, age of system components in the data storage system, number of viable replicas for the data, error rate associated with reading the data.

7. The method of claim 5 wherein the one or more factors comprise one or more events that influence the probability of data loss or the potential for recovery of the data from one or more replicas of the data.

8. The method of claim 1 wherein number of the temporary replicas created is reduced, in response to determining that the number of replicas for the data is restored to a predetermine threshold.

9. The method of claim 1 wherein a temporary replica is used to recover from data loss.

10. A system for enhancing data recovery in a data storage system, the system comprising:
    one or more computer processors;
    one or more computer readable storage media; and
    program instructions stored on the one or more computer readable storage media for execution by at least one of the one or more computer processors, the program instructions comprising:

program instructions to determine whether one or more data storage mediums in a data storage system are unavailable;

program instructions to determine data associated with the one or more data storage mediums in the data storage system that is at a risk of loss, due to the one or more data storage mediums being unavailable;

program instructions to identify a subset of data that is highly vulnerable to loss from the data that is determined to be at the risk of loss, wherein the data that is highly vulnerable to loss is determined based on calculating a probability that the data will be lost during a future failure event; and program instructions to create one or more temporary replicas of the data that is highly vulnerable to loss.

11. The system of claim 10 wherein the data that is at the risk of loss comprises data stored on the one or more unavailable data storage mediums.

12. The system of claim 10 wherein at least one temporary replica is created on an external storage device or a solid state storage device.

13. The system of claim 10 wherein the data that is highly vulnerable to loss comprises data with a number of replicas that is less than a predetermined threshold.

14. A computer program product comprising a computer readable storage medium having a computer readable program, wherein the computer readable program when executed on a computer causes the computer to:

determine whether one or more data storage mediums in a data storage system are unavailable;

determine data associated with the one or more data storage mediums in the data storage system that is at a risk of loss, due to the one or more data storage mediums being unavailable;

identify a subset of data that is highly vulnerable to loss from the data that is determined to be at the risk of loss, wherein the data that is highly vulnerable to loss is determined based on calculating a probability that the data will be lost during a future failure event; and create one or more temporary replicas of the data that is highly vulnerable to loss.

15. The computer program product of claim 14 wherein the data that is at the risk of loss comprises data stored on the one or more unavailable data storage mediums.

16. The computer program product of claim 14 wherein at least one temporary replica is created on an external storage device or a solid state storage device.

17. The computer program product of claim 14 wherein the data that is highly vulnerable to loss comprises data with a number of replicas that is less than a predetermined threshold.

* * * * *